Dec. 14, 1965         W. H. WARD ETAL         3,222,852
SNAPPING ROLL ASSEMBLY FOR CORN HARVESTERS
Filed April 29, 1963                     7 Sheets-Sheet 1
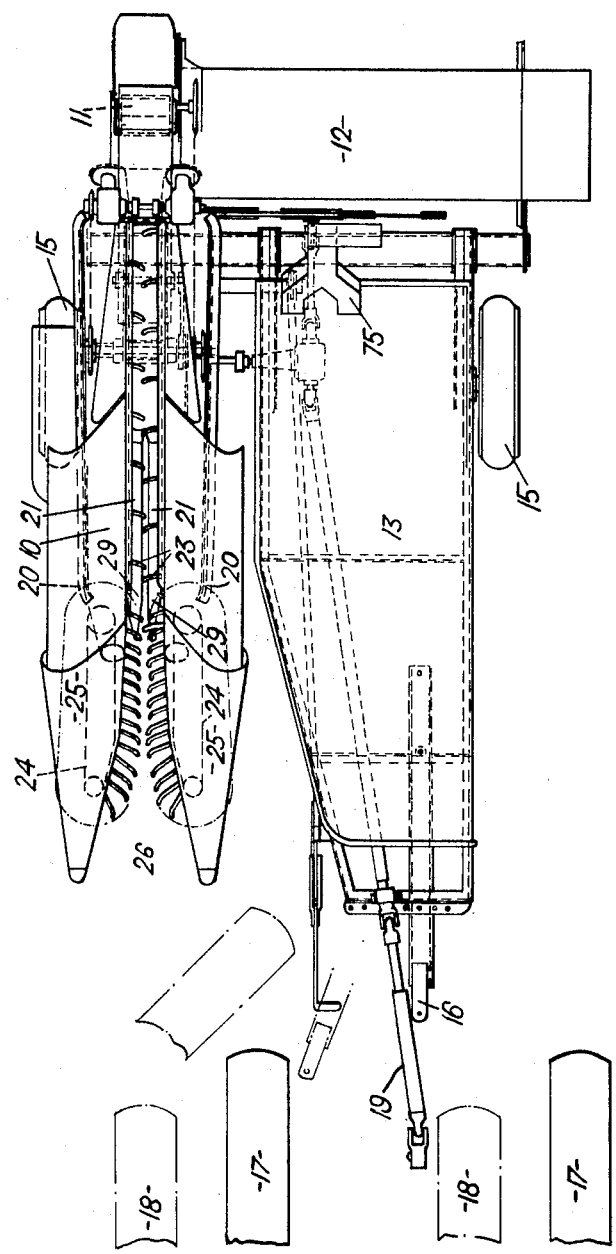
Inventors
WALTER HENRY WARD
RICHARD LESLIE MILLMAN
By Wolfe, Hubbard,
Voit & Osann
Attorneys Dec. 14, 1965   W. H. WARD ETAL   3,222,852
SNAPPING ROLL ASSEMBLY FOR CORN HARVESTERS
Filed April 29, 1963   7 Sheets-Sheet 2
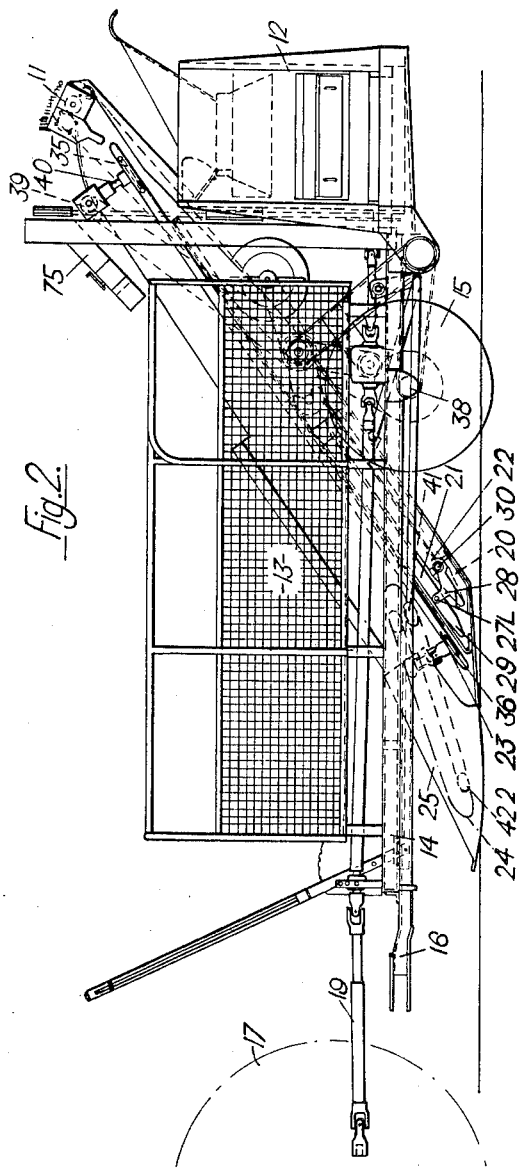
Inventors
WALTER HENRY WARD
RICHARD LESLIE MILLMAN
By Wolfe, Hubbard,
Voit & Osann
Attorneys

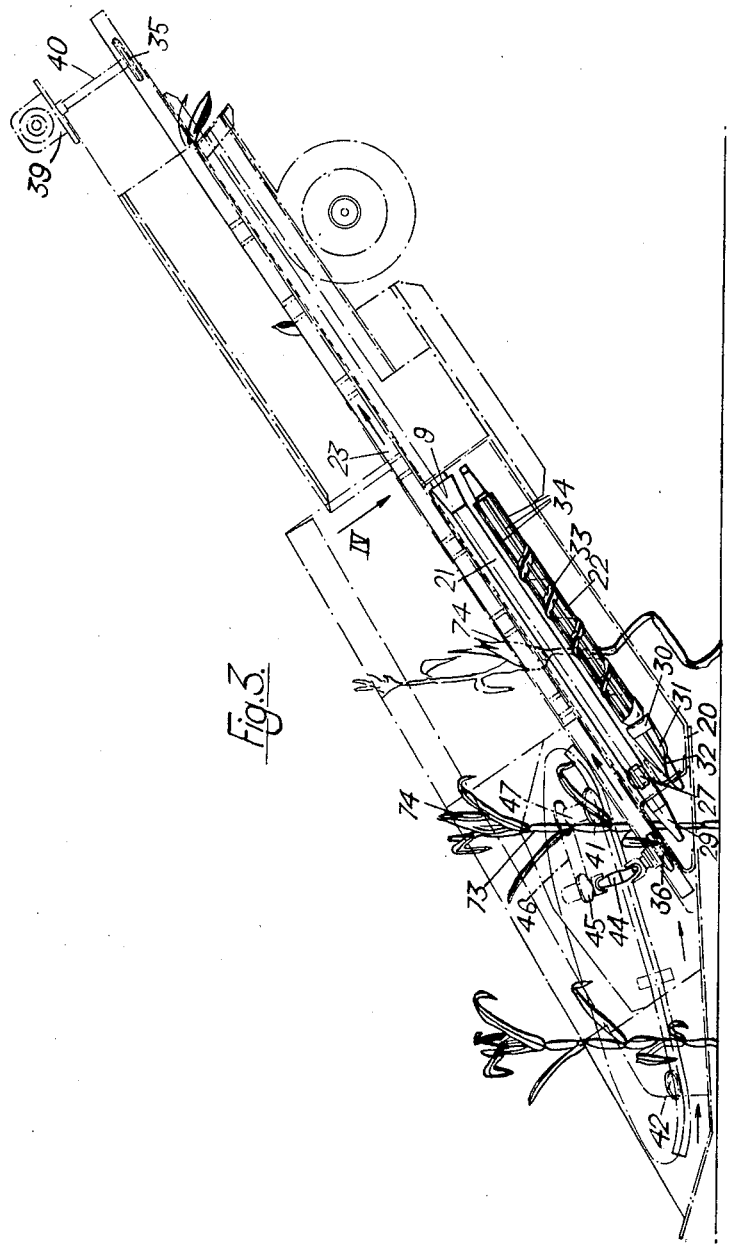

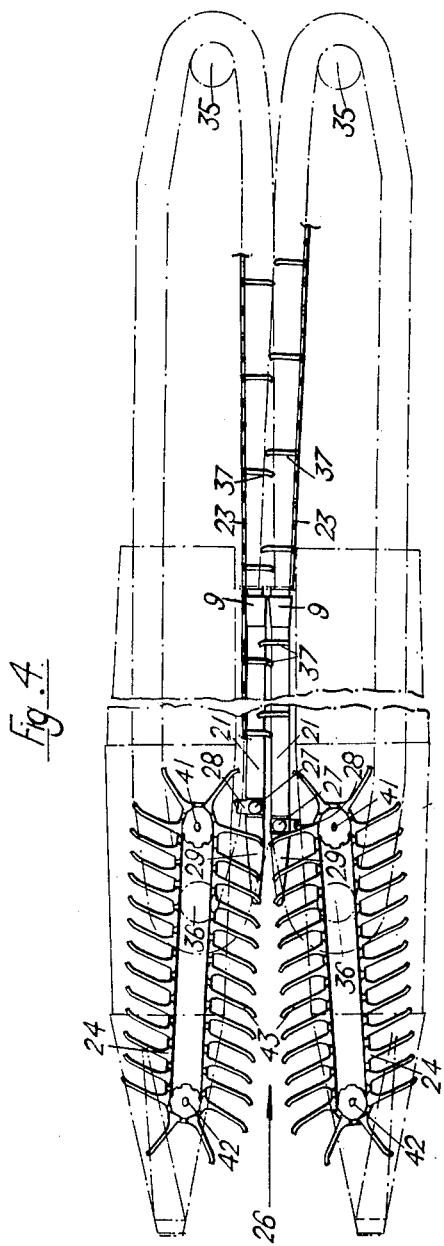

Dec. 14, 1965  W. H. WARD ETAL  3,222,852
SNAPPING ROLL ASSEMBLY FOR CORN HARVESTERS
Filed April 29, 1963  7 Sheets-Sheet 5
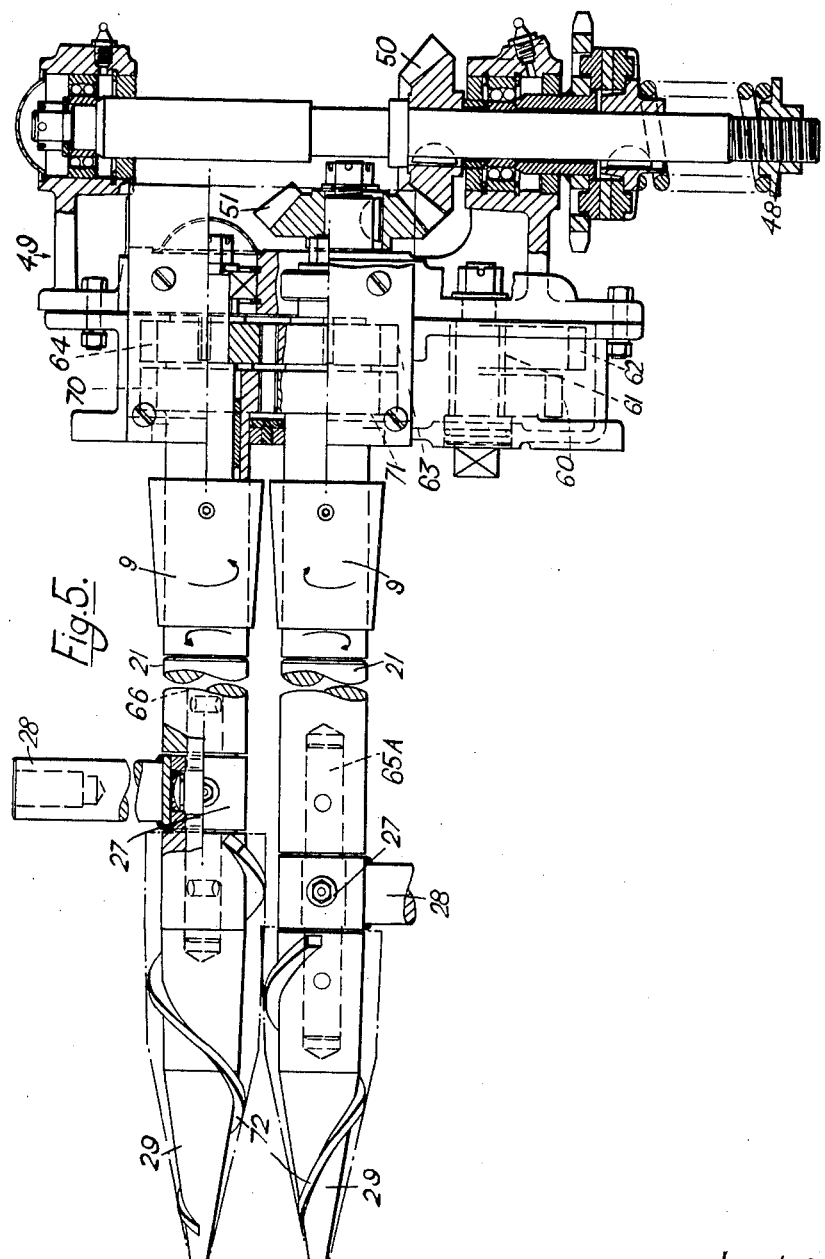
Inventors
WALTER HENRY WARD
RICHARD LESLIE MILLMAN
By Wolfe, Hubbard,
Voit & Osann
Attorneys

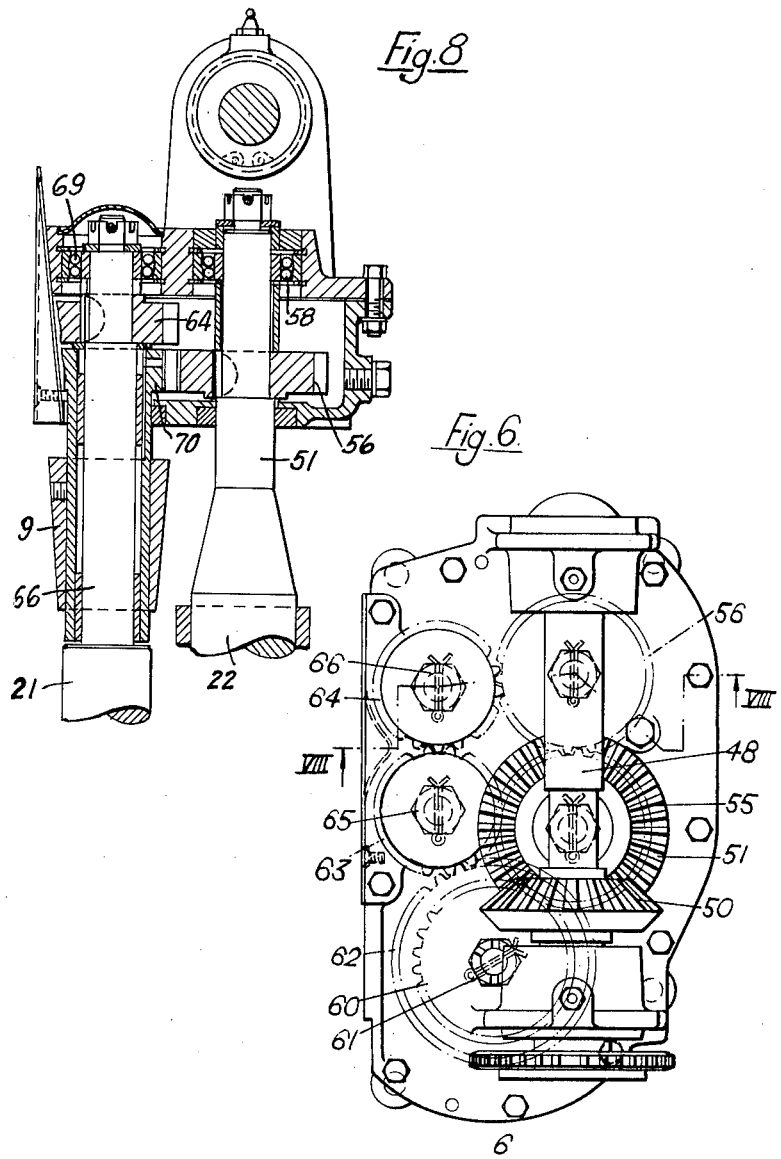

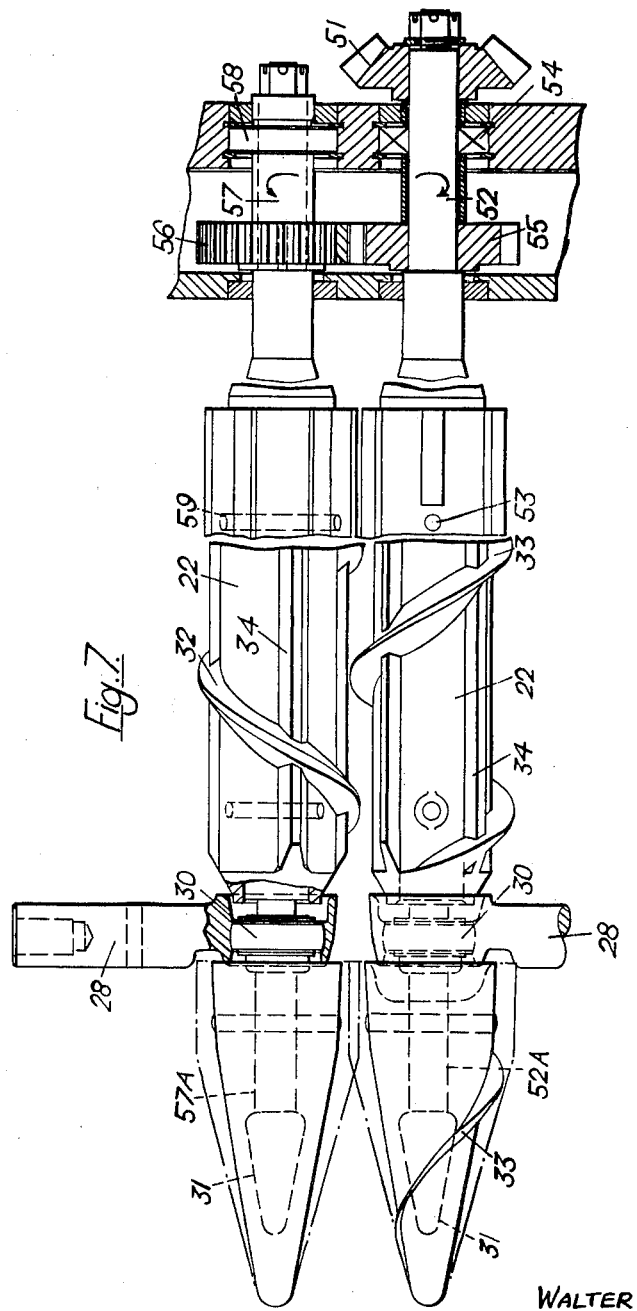

United States Patent Office 3,222,852
Patented Dec. 14, 1965

3,222,852
SNAPPING ROLL ASSEMBLY FOR
CORN HARVESTERS
Walter H. Ward, Three Rivers, Vereeniging, Transvaal, and Richard L. Millman, Vereeniging, Transvaal, Republic of South Africa, assignors to South African Farm Implement Manufacturers Limited, Vereeniging, Transvaal, Republic of South Africa
Filed Apr. 29, 1963, Ser. No. 276,357
Claims priority, application Great Britain, Apr. 28, 1962, 16,299/62
4 Claims. (Cl. 56—104)

This invention relates generally to corn harvesting machines and more particularly concerns the snapping roll assemblies of such machines.

Conventional corn harvesters utilize a pair of counter-rotating snapping rolls which embrace the stalks as the harvester moves through a field. Helical projections wound about the rolls define rearwardly moving conveyor elements. The rolls grip the stalks and pull them downwardly, snapping off the ears which are too large to pass between the rolls. The helical projections draw the stalks along the axis of the rolls as the stalks are pulled downwardly; the stalks being drawn axially at about the same rate as the harvester moves forwardly so that, in effect, the stalks remain rooted in place and are simply collapsed. The projections also usually serve to carry the severed ears rearwardly along the rolls and to the next corn handling mechanism in the harvester.

A difficulty with such constructions is that the snapping rolls must be "aggressive" to reliably grip the stalks, and flutes or knobs are conventionally formed on the rolls to aid this function. However, such aggressive rolls also tend to treat the ears of corn harshly, resulting in damage and losses. To resolve this difficulty, some harvester designs include stationary breaking plates past which the stalks are pulled to snap off the ears of corn, the plates thereafter preventing the ears from being engaged by the rolls. This expedient, however, gives rise to the substantial problem of accumulated broken stalks on the plates which clog the harvester and interfere with proper operation.

Accordingly, the general aim of the invention is to provide a corn harvester having a reliable and effective ear snapping action without the danger of damaging the ears or of clogging the machine with broken stalks or the like.

It is also an object of the invention to provide a stalk gathering and channeling arrangement which avoids corn losses from premature dislodgement of the ears from the stalks.

A more specific object is to provide an ear snapping and conveying arrangement which smoothly transfers the ears to the next portion of the harvester.

Other objects and advantages of the invention will become apparent upon reading the following detailed description and upon reference to the drawings, in which:

FIGURE 1 is a plan view of a corn harvester incorporating the novel snapping roll assembly of the present invention;

FIG. 2 is a side elevation of the harvester shown in FIG. 1;

FIG. 3 is a diagrammatic side elevation of the novel snapping roll assembly of the harvester illustrating its operation;

FIG. 4 is a diagrammatic plan view of the snapping roll assembly taken generally in the direction of the arrow IV in FIG. 3;

FIG. 5 is a plan view of the harvester gear box;

FIG. 6 is an end elevation of the gear box shown in FIG. 5;

FIG. 7 is another plan view of the conveyor rolls; and
FIG. 8 is a section taken substantially along the line VIII—VIII in FIG. 6.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Referring now to the drawings, there is shown in FIGURES 1 and 2 a corn harvester which embodies the novel snapping roll assembly 10 of the present invention. The corn harvester also includes a stalk ejection apparatus 11, a sheller 12 and a bagging and storage platform 13, all of which are indicated generally and are mounted on a harvester frame 14 supported by ground engaging wheels 15. Projecting forwardly from the frame 14 is a tongue 16 by means of which the harvester may be towed by a tractor. The position of the tractor relative to the harvester in its working position is indicated by the tractor rear wheels 18. The tractor also supplies power to the harvester from tractor power take-off by means of a power take-off shaft 19. As shown in FIG. 1, the snapping roll assembly 10 is mounted on a side frame 20 located to one side of the harvester and, in the working position, extends laterally beyond the rear wheels 18.

In accordance with the present invention, the snapping roll assembly 10 includes a pair of rotatable smooth snapping rolls 21 which are adapted to snap the ears of corn from the standing corn stalks as the stalks are pulled downwardly and rearwardly by a pair of rotatable aggressive gripping rolls 22. In the preferred embodiment, a pair of conveying chains 23 extend over the snapping rolls 21 for moving the ears of corn rearwardly from the snapping roll assembly 10. For drawing and guiding the corn stalks into the snapping rolls 21 and gripping rolls 22, a pair of endless gathering chains 24 extend outwardly and forwardly from the snapping roll assembly 10. Preferably, the lower ends of the snapping rolls 21 and gripping rolls 22 are disposed within a pair of diverging casings 25 which define an entrance path 26 for the corn stalks.

Referring more particularly to FIGS. 3 and 4, the two snapping rolls 21 are arranged in generally parallel, side-by-side relationship with their axes disposed down and forward of the harvester so as to define an acute angle with respect to the ground. The rolls 21 are journalled with their rear, upper ends in bearings secured to the harvester gear box, as will be more particularly described hereinafter. At their forward ends, the rolls 21 are journalled in bearings 27 which are supported by brackets 28 in the frame 20. Conical nose pieces 29 are secured on the rolls 21 and extend forwardly of the bearings 27 for guiding the corn stalks between the snapping rolls.

In accordance with another aspect of the present invention, the snapping rolls 21 have rear end portions in the form of clearing pieces 9 which are adapted to rotate independently of the rolls 21 and in opposite directions. These clearing pieces serve to provide a smooth feed from the rolls 21 in a manner to be described. In the preferred embodiment, the snapping rolls 21, the nose pieces 29, and the clearing pieces 9 are all formed with smooth surfaces so that the kernels of corn are not torn from the ears as the ears are snapped from the stalks.

The gripping rolls 22 are located in parallel relationship just below the snapping rolls 21. The gripping rolls 22 are also journalled in their upper ends in bearings in the harvester gear box and at their forward ends in bearings 30 supported by the brackets 28. Similar to the snapping rolls 21, the gripping rolls also have conical nose pieces 31 projecting forwardly from the bearings 30. Preferably, the gripping rolls are provided with helically wound ridges 33 for gripping the corn stalks and pulling them downwardly and readwardly. The conical nose pieces 31 are similarly formed with helical ridges 32. In addition, the gripping rolls 22 are provided with axially extending flutes 34 which preferably extend the full length of the gripping rolls and which are tapered in cross section. The helical ridges 33 and the longitudinal flutes 34 of each gripping roll are suitably registered to intermesh with those of the other gripping roll when the rolls are rotated in opposite directions.

As described above, the snapping rolls 21 and similarly the gripping rolls, are journalled with their axes disposed down and forward of the harvester, and are nominally parallel. However, provision is made for slight divergence of the rolls at their forward ends by adjustably positioning thet brackets 28 with respect to the frame 20.

For moving the ears of corn rearwardly over the smooth snapping rolls 21, the conveying chains 23 are mounted immediately above the snapping rolls. Each of the endless conveying chains is trained over an upper drive sprocket 35 at the top of the snapping roll assembly 10 and over a lower sprocket 36 mounted immediately in front of the nose pieces 29. The chains 23 are shown diagrammatically in the drawings (See FIG. 4) and have outwardly extending fingers 37 mounted at intervals along their lengths. The fingers 37 of one conveying chain are adapted to intermesh with those of the other conveying chain. Thus it will be understood the the cooperating pair of conveying chains 23 form a conveyor with pushing elements which move the corn rearwardly of the snapping rolls. In the present instance, the conveying chains 23 are ground driven from the harvester axle 38 through a chain drive (not shown) which is coupled through a gear head 39 to shafts 40 on which the drive sprockets 35 are mounted.

For drawing the corn stalks between the casings 25 and directing the stalks between the rolls 21 and 22, the two gathering chains 24 are each mounted between sprockets 41 and 42 and extend forwardly and outwardly from the snapping roll assembly 10. The gathering chains 24 are also provided with fingers 43 which extend into the feed path 26. As seen in FIG. 4, the fingers, when in their cooperating relation, move in tip-to-tip relation and the gathering chains 24 are disposed in slightly diverging relationship so that the path 26 narrows rearwardly between the chains 24. The rear ends of the gathering chains 24 also overlap the front ends of the conveying chains 23. Moreover, the fingers 43 form a grating so that, from the moment of first contact of the harvester with the corn stalks, any ears of corn which drop from the stalks fall onto the grating and are passed rearwardly by the gathering chains 24 to the conveying chains. 23.

In the illustrated embodiment, the gathering chains 24 are also ground-driven by the same drive mechanism which drives the conveying chains 23. As shown in FIG. 3, each drive sprocket 41 is driven from a sprocket wheel 45 mounted on a drive shaft 44 which is coupled to the lower sprocket 36 of the conveying chains 23. A drive chain 46 couples the sprocket wheel 45 to a sprocket 47 mounted on a shaft 47a to which the drive sprocket 41 is secured.

The gathering chains 24 and conveying chains 23 are preferably driven from the ground at speeds such that their respective fingers 43 and 37, in the feed path 26, travel at a speed whereby the horizontal component is directed readwardly relative to the frame 14 approximately equal to the ground speed of the harvester. In other words, in the direction of the harvester's travel, the fingers 37 and 43 are substantially stationary relative to the ground.

Driving power is supplied to the snapping rolls 21, gripping rolls 22 and clearing pieces 9 from a shaft through the harvester gear box 49. The power take-off shaft 19 driven by the tractor provides power for the input shaft 48 of the harvester gear box, as well as for the stalk ejection apparatus 12 and the sheller 13.

For driving the gripping rolls 22, a bevel gear 50 on the shaft 48 engages a second bevel gear 51 on a shaft 52 which is journalled by a bearing 54 in the gear box 49. One of the gripping rolls 22 is secured to the shaft 52 by means of a pin 53. Also secured to the shaft 52 is a spur gear 55 which drives another spur gear 56 mounted on a shaft 57 journalled by another bearing 58 in the gear box 49. The other gripping roll 22 is secured to the shaft 57 by a pin 59. Thus, the two gripping rolls 22 are rotated in opposite directions.

To drive the snapping rolls 21, the spur gear 55 also meshes with a gear wheel 60 which is secured on an auxiliary shaft 61. A further gear wheel 62 is secured to the auxiliary shaft 61 and meshes with gear wheel 63 to drive one of the snapping rolls 21 through the shaft 65, which is also mounted in bearings in the gear box 49. In addition, the gear wheel 63 also engages a gear wheel 64 to drive the other snapping roll 21 through a shaft 66 mounted in bearing 69. The snapping rolls 21 are thus driven in opposite directions similar to the gripping rolls 22.

To drive the clearing pieces 9, the gear wheel 56, as seen in FIG. 8, also meshes with gear 70 formed integrally with the right-hand clearing piece 9. The gear 70 engages a further gear 71 integrally formed with the left-hand clearing piece 9. The clearing pieces 9 thus rotate in opposite directions, bearings being interposed between each clearing piece and the associated snapping roll to allow independent opposite rotation.

It will be understood that the shaft 48 is rotated so that the snapping rolls 21 and gripping rolls 22 feed downwardly and the clearing pieces 9 feed upwardly.

The bracket supported bearings 27 for the snapping rolls are shown in detail in FIG. 5. The rolls 21 are pinned to the shaft 66 respectively which pass through the bearings 27 and to which the nose pieces 29 are pinned. A similar arrangement is shown in FIG. 7 for the gripping rolls 22.

It has been found that smooth nose pieces are better for harvesting ears of corn which grow low on the stalks. On the other hand, ribbed nose pieces are more satisfactory for collecting ears of corn high on the stalks. FIG. 5 illustrates a modification in which the nose pieces are provided with ribs 72.

In operation, the tractor is driven across a field of corn so that the feed path 26 is aligned with a row of corn stalks. Since the fingers 43 are angled with respect to the gathering chains 24, the corn stalks 73 (FIG. 3) are forced sidewise to the middle of the feed path 26 and are fed smoothly between the nose pieces 29 and 31 of the respective snapping rolls and gripping rolls. In addition, the fingers 43, as previously mentioned, form a grating which catches any ears that drop off the corn stalks and passes the ears rearwardly to the conveying chains 23.

The corn stalks are also engaged by the aggressive gripping rolls 22 which drag the stalks downwardly and when an ear 74 engages the snapping rolls 21 it is broken off the stalk. The harvested ear of corn is then engaged by the fingers 37 and is conveyed to the upper end of the conveying chains 23.

It will be appreciated that the provision of the upper smooth snapping rolls 21 in conjunction with the lower aggressive gripping rolls 22 makes it possible to use these smooth rolls 21 as the bed of a conveyor on which the ears travel on their passage upwardly, thus greatly simplifying the design of the harvester. With this arrangement, it is, however, necessary to feed the ears onto a stationary floor at the top end, and this introduces a potential point of blockage. In order to avoid the possibility of this trouble, the clearing pieces 9 are rotated in the opposite direction to the snapping rolls 21 so that they feed the ears upwardly. The ears of corn are then passed on to the sheller 12 which separates the kernels from the rest of the cobs, the kernels being delivered by means of the ducting 75 to the bagging platform 13 where they are bagged and temporarily stored.

Other modifications of the novel snapping roll assembly may also be made without departing from the present invention.

We claim as our invention:

1. In a corn harvester, the combination comprising, a pair of elongated counterrotating gripping rolls journalled with their axes disposed down and forward of the harvester, said gripping rolls having axially extending flutes and helically wound ridges for gripping stalks and pulling them downwardly and rearwardly, the axial flutes and helical ridges on one of said gripping rolls being disposed to intermesh with the axial flutes and helical ridges on the other of said gripping rolls as said rolls are rotated, a pair of elongated counterrotating smooth snapping rolls journalled above and generally parallel to said gripping rolls, said snapping rolls having relatively short clearing pieces at the rear ends thereof rotating in directions opposite to the long forward portions of the associated snapping rolls, and an endless conveyor chain having fingers extending over said snapping rolls for moving ears of corn rearwardly over the snapping rolls.

2. The combination as defined in claim 1 including an endless chain journalled forwardly and outwardly from said snapping rolls, said chain including closely spaced elongated fingers lying in a substantially horizontal plane, and means for driving said chain so that said fingers define a rearwardly moving grate.

3. The combination as defined in claim 1 including a pair of endless chains journalled in spaced relation and extending forwardly and outwardly from said snapping rolls, said chains including closely spaced elongated fingers lying in a substantially horizontal plane, and means for driving said chains in opposite directions so that said fingers when in their cooperating relation move in tip-to-tip relation to define a rearwardly moving grate with an intermediate vertically extending channel between the tips of said fingers leading to said snapping rolls.

4. In a corn harvester, the combination comprising a pair of counterrotating gripping rolls journalled with their axis disposed down and forward of the harvester, a pair of counterrotating smooth snapping rolls journalled above and generally parallel to said gripping rolls, a pair of endless chains journalled in spaced relation and extending forwardly and outwardly from said snapping rolls, said chains including closely spaced elongated fingers lying in a substantially horizontal plane, and means for driving said chains in opposite directions so that said fingers when in their cooperating relation move in tip-to-tip relation to define a rearwardly moving loose corn ear supporting grate and providing an intermediate vertically extending channel between the tips of said fingers leading to said snapping rolls.

References Cited by the Examiner
UNITED STATES PATENTS

| 2,169,070 | 8/1939 | Kuhlman | 56—104 X |
| 2,234,447 | 3/1941 | Norman. | |
| 2,366,408 | 1/1945 | Jenson | 56—104 |
| 2,534,685 | 12/1950 | Shrader | 56—104 X |
| 3,069,832 | 12/1962 | Baker | 56—104 |

ANTONIO F. GUIDA, *Acting Primary Examiner.*

T. GRAHAM CRAVER, *Examiner.*